(12) United States Patent
Yang

(10) Patent No.: US 12,445,184 B2
(45) Date of Patent: Oct. 14, 2025

(54) BEAM INDICATION METHOD, NETWORK DEVICE, AND TERMINAL DEVICE

(71) Applicant: VIVO MOBILE COMMUNICATION CO., LTD., Dongguan (CN)

(72) Inventor: Yu Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 87 days.

(21) Appl. No.: 18/223,017

(22) Filed: Jul. 17, 2023

(65) Prior Publication Data

US 2023/0361843 A1 Nov. 9, 2023

Related U.S. Application Data

(63) Continuation of application No. PCT/CN2022/072464, filed on Jan. 18, 2022.

(30) Foreign Application Priority Data

Jan. 18, 2021 (CN) .......................... 202110065344.0

(51) Int. Cl.
*H04B 7/06* (2006.01)
*H04L 5/00* (2006.01)

(52) U.S. Cl.
CPC ......... *H04B 7/0639* (2013.01); *H04B 7/0652* (2013.01); *H04L 5/0048* (2013.01); *H04L 5/0094* (2013.01)

(58) Field of Classification Search
CPC .................................................... H04B 7/0639
USPC .......................................................... 375/262
See application file for complete search history.

(56) References Cited

U.S. PATENT DOCUMENTS

| 2020/0077395 | A1 | 3/2020 | Guo | |
| 2021/0153085 | A1* | 5/2021 | Rahman | ............... H04L 5/0053 |
| 2023/0308249 | A1* | 9/2023 | Matsumura | ........... H04L 5/0053 |
| 2023/0379936 | A1* | 11/2023 | Matsumura | .......... H04B 7/0639 |

FOREIGN PATENT DOCUMENTS

| CN | 111510873 A | 8/2020 |
| WO | 2019215888 A1 | 11/2019 |

OTHER PUBLICATIONS

International Search Report issued in corresponding International Application No. PCT/CN2022/072464, mailed Apr. 15, 2022, 6 pages.

(Continued)

*Primary Examiner* — Lihong Yu
(74) *Attorney, Agent, or Firm* — IPX PLLC

(57) ABSTRACT

A beam indication method, a network device, and a terminal device are provided. The method includes: receiving a first command sent by the network device. The first command is used to indicate at least one Transmission Configuration Indication (TCI) state in a TCI state pool. The at least one TCI state comprises a joint TCI state or a separate TCI state. The TCI state pool is preconfigured by the network device. The at least one TCI state is used to indicate common beam information of a plurality of channels or Reference Signals (RSs). The method further includes determining, according to the first command, the at least one TCI state corresponding to an Uplink (UL) or a Downlink (DL).

14 Claims, 4 Drawing Sheets

(56) References Cited

OTHER PUBLICATIONS

Futurewei, "Enhancement on multi-beam operation", 3GPP TSG RAN WG1 Meeting #103-e R1-2007546, Nov. 2020, 9 pages.
ZTE, "Enhancements on Multi-beam Operation", 3GPP TSG RAN WG1 Meeting #103-e R1-2007763, Nov. 2020, 19 pages.
CATT, "Discussion on enhancement on multi-beam operation", 3GPP TSG RAN WG1 #103-e R1-2007824, Nov. 2020, 10 pages.
Extended European Search Report issued in related European Application No. 22739182.8, mailed Jun. 21, 2024, 6 pages.
NTT Docomo et al: "Discussion on multi-beam operation", 3GPP Draft; R1-2009174, Oct. 2020, 22 pages.
Mediatek Inc: "Enhancement on multi-beam operation", 3GPP Draft; R1-2008956, Oct. 2020, 16 pages.
Notice of Reason for Refusal issued in related Application No. 2023-543229, mailed Aug. 6, 2024, 8 pages.
Notice of Reason for Refusal issued in related Application No. 2023-543229, mailed Dec. 10, 2024, 3 pages.
First Office Action issued in related Chinese Application No. 202110065344.0, mailed Jun. 11, 2025, 9 pages.
Vivo, "Further discussion on multi beam enhancement", 3GPP tsg_ran\wg1_rl1,tsgr1_103-e, R1-2007644, Nov. 2020, 26 pages.

\* cited by examiner

BEAM INDICATION METHOD, NETWORK DEVICE, AND TERMINAL DEVICE

CROSS-REFERENCE TO RELATED APPLICATIONS

The present application is a continuation of International Application No. PCT/CN2022/072464, filed on Jan. 18, 2022, which claims priority to Chinese Patent Application No. 202110065344.0, filed on Jan. 18, 2021 The entire contents of each of the above-referenced applications are expressly incorporated herein by reference.

TECHNICAL FIELD

This application pertains to the field of communications technologies, and specifically, relates to a beam indication method, a network device, and a terminal device.

BACKGROUND

In 5G New Radio (NR), analog beamforming is full-bandwidth transmission. An array element in each polarization direction on a panel of each high-frequency antenna array can transmit an analog beam only in a time division multiplexing mode. A beamforming weight of the analog beam is implemented by adjusting a parameter of a device such as a radio frequency front-end phase shifter. In academia and industry, training of analog beamforming vectors is usually performed in a polling mode. For example, an array element in each polarization direction on each antenna panel sends a training signal (that is, a candidate beamforming vector) sequentially at an agreed time in a time division multiplexing mode, and a terminal reports a beam report after performing measurement, so that a network side can use the training signal to implement analog beam transmission to transmit a next service.

Content of beam reports usually includes identifiers of several optimal transmit beams and measured received power of each transmit beam. When performing beam measurement, the network side configures a Reference Signal (RS) resource set. The RS resource set includes at least one reference signal resource, for example, a Synchronization Signal Block (SSB) resource or a Channel State Information (CSI)-RS resource. A User Equipment (US) measures L1-Reference Signal Received Power (RSRP) or an L1-Signal to Interference plus Noise Ratio (SINR) of each RS resource, and reports at least one optimal measurement result to the network side, where report content includes an SS/PBCH Block Resource Indicator (SSBRI) or a CSI-RS Resource Indicator (CRI), and the L1-RSRP/L1-SINR. The report content reflects at least one optimal beam and quality of the beam, so that the network side determines beam information used for channel or signal transmission with the UE.

After the beam measurement and beam reporting, the network side may provide a beam indication for a downlink channel or reference signal and an uplink channel or reference signal, where the beam indication is used to establish a beam link between the network side and the UE to implement channel or reference signal transmission.

However, because the prior art does not provide a same beam indication mechanism for various channels and reference signals, high signaling overheads are required. In addition, the prior art does not provide a good common beam information indication mode for a plurality of channels and/or RSs.

SUMMARY

Embodiments of this application provide a beam indication method, a network device.

According to a first aspect, an embodiment of this application provides a beam indication method. The method is performed by a network device and includes:
configuring a Transmission Configuration Indication (TCI) state pool, where the TCI state pool includes a plurality of TCI states; and
sending a first command to a terminal device, where the first command is used to indicate at least one TCI state in the TCI state pool, the at least one TCI state is used to indicate common beam information of a plurality of channels and/or RSs, and the at least one TCI state includes a joint TCI state and/or a separate TCI state.

According to a second aspect, an embodiment of this application provides a beam indication method. The method is performed by a terminal device and includes:
receiving a first command sent by a network device, where the first command is used to indicate at least one TCI state in a TCI state pool, the at least one TCI state includes a joint TCI state and/or a separate TCI state, the TCI state pool is preconfigured by the network device, and the at least one TCI state is used to indicate common beam information of a plurality of channels and/or RSs; and
determining, according to the first command, the at least one TCI state corresponding to an Uplink (UL) and/or a Downlink (DL).

According to a third aspect, an embodiment of this application provides a network device, including
a first configuration module, configured to configure a TCI state pool, where the TCI state pool includes a plurality of TCI states; and
a first sending module, configured to send a first command to a terminal device, where the first command is used to indicate at least one TCI state in the TCI state pool, the at least one TCI state is used to indicate common beam information of a plurality of channels and/or RSs, and the at least one TCI state includes a joint TCI state and/or a separate TCI state.

According to a fourth aspect, an embodiment of this application provides a terminal device, including:
a first receiving module, configured to receive a first command sent by a network device, where the first command is used to indicate at least one TCI state in a TCI state pool, the at least one TCI state includes a joint TCI state and/or a separate TCI state, the TCI state pool is preconfigured by the network device, and the at least one TCI state is used to indicate common beam information of a plurality of channels and/or RSs; and
a first determining module, configured to determine, according to the first command, the at least one TCI state corresponding to a UL and/or a DL.

According to a fifth aspect, an embodiment of this application provides a network device. The network device includes a processor, a memory, and a program or instructions stored in the memory and capable of running on the processor When the program or instructions are executed by the processor, the steps of the beam indication method according to the first aspect are implemented.

According to a sixth aspect, an embodiment of this application provides a readable storage medium. The readable storage medium stores a program or instructions. When the program or instructions are executed by a processor, the steps of the beam indication method according to the first aspect are implemented.

According to a seventh aspect, an embodiment of this application provides a terminal device. The terminal device includes a processor, a memory, and a program or instructions stored in the memory and capable of running on the processor. When the program or instructions are executed by the processor, the steps of the beam indication method according to the second aspect are implemented.

According to an eighth aspect, an embodiment of this application provides a readable storage medium. The readable storage medium stores a program or instructions. When the program or instructions are executed by a processor, the steps of the beam indication method according to the second aspect are implemented.

According to a ninth aspect, an embodiment of this application provides a chip. The chip includes a processor and a communications interface. The communications interface is coupled to the processor. The processor is configured to run a program or instructions to implement the beam indication method according to the first aspect or the second aspect.

In the embodiments of this application, the network device configures the TCI state pool and sends the first command to the terminal device, where the first command is used to indicate the at least one TCI state in the TCI state pool, and the at least one TCI state is used to indicate the common beam information of the plurality of channels and/or RSs, so that the terminal device can determine, according to the first command, the at least one TCI state corresponding to the UL and/or the DL. Therefore, the network device can implement a unified beam indication mechanism for the plurality of channels and/or RSs, unnecessary signaling overheads are reduced, and the beam indication mechanism is improved.

DETAILED DESCRIPTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The technical solutions of the present disclosure may be applied to various communications systems, such as Global System for Mobile Communications (GSM), Code Division Multiple Access (CDMA) system, Wideband Code Division Multiple Access (WCDMA), General Packet Radio Service (GPRS), Long Term Evolution (LTE), and NR.

A UE may also be referred to as a mobile terminal, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device, another processing device connected to a wireless modem, an in-vehicle device, a wearable device, a terminal device in a future 5G network, a terminal device in a future evolved Public Land Mobile Network (PLMN), or the like.

A network device may be a device configured to communicate with a mobile device. The network device may be a Base Transceiver Station (BTS) in a GSM or CDMA, or may be a NodeB (NB) in Wideband Code Division Multiple Access (WCDMA), or may be an Evolved Node B (eNB or eNodeB) in LTE, an access point, an in-vehicle device, a wearable device, a network-side device in a future 5G network, or a network device in a future evolved PLMN The beam indication method provided in the embodiments of this application are hereinafter described in detail by using embodiments and application scenarios thereof with reference to the accompanying drawings.

Figure 1:
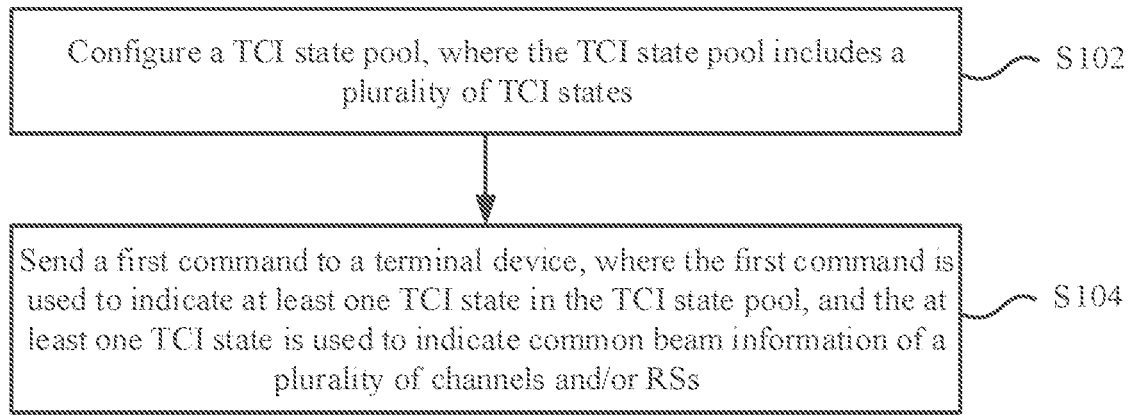
FIG. 1 is a schematic flowchart of a beam indication method according to an embodiment of this application.

FIG. 1 is a schematic flowchart of a beam indication method according to an embodiment of this application. As shown in FIG. 1, the beam indication method is performed by a network device and includes the following steps.

S102. Configure a TCI state pool, where the TCI state pool includes a plurality of TCI states.

S104. Send a first command to a terminal device, where the first command is used to indicate at least one TCI state in the TCI state pool, and the at least one TCI state is used to indicate common beam information of a plurality of channels and/or RSs.

The first command includes Downlink Control Information (DCI) signaling and/or a Media Access Control (MAC) Control Element (CE) command. The at least one TCI state includes a joint TCI state and/or a separate TCI state.

Figure 2:
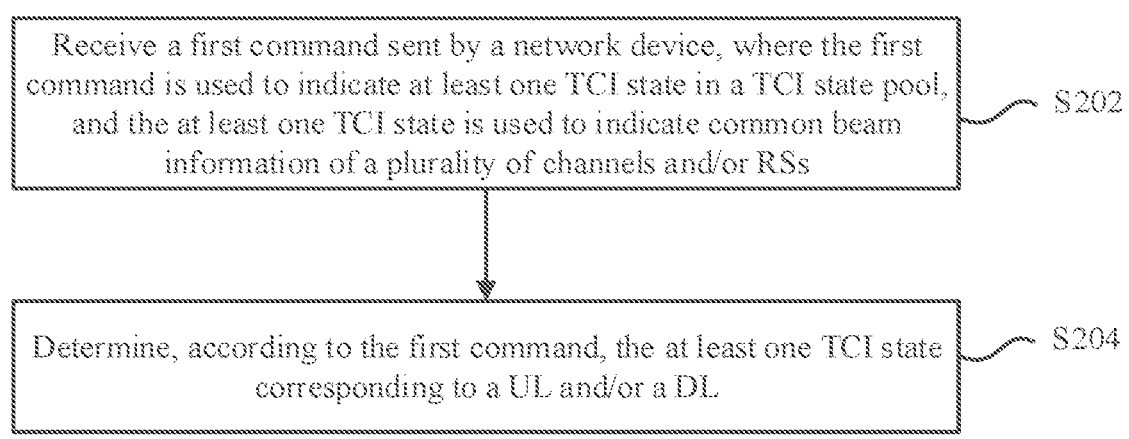
FIG. 2 is a schematic flowchart of a beam indication method according to another embodiment of this application.

FIG. 2 is a schematic flowchart of a beam indication method according to another embodiment of this application. As shown in FIG. 2, the beam indication method is performed by a terminal device and includes the following steps.

S202. Receive a first command sent by a network device, where the first command is used to indicate at least one TCI state in a TCI state pool, and the at least one TCI state is used to indicate common beam information of a plurality of channels and/or RSs.

The TCI state pool is preconfigured by the network device, and the at least one TCI state includes a joint TCI state and/or a separate TCI state.

S204. Determine, according to the first command, the at least one TCI state corresponding to a UL and/or a DL.

Figure 3:
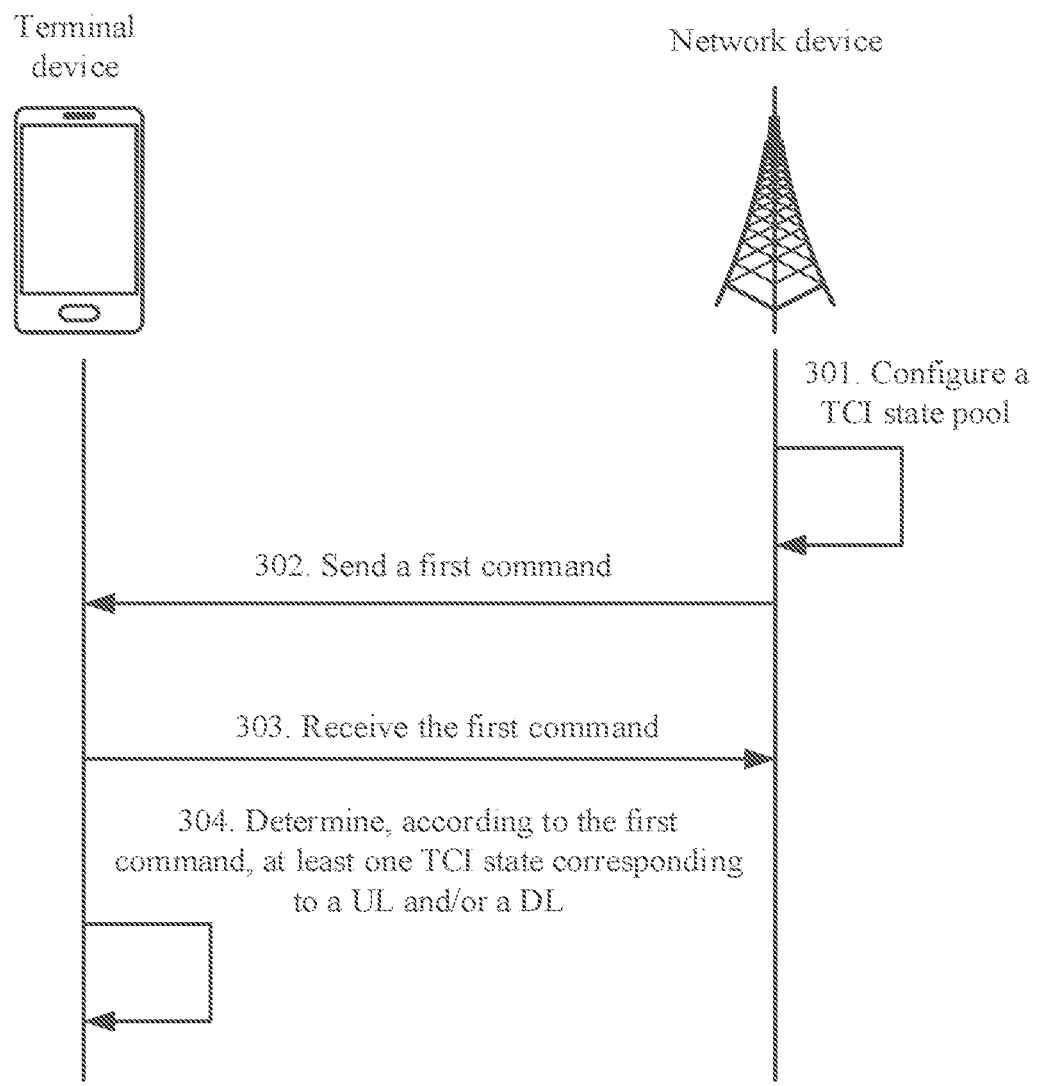
FIG. 3 is a schematic swimlane diagram of a beam indication method according to an embodiment of this application.

FIG. 3 is a schematic swimlane diagram of a beam indication method according to an embodiment of this application. As shown in FIG. 3, the beam indication method is performed by a network device and a terminal device and includes the following steps.

S301. The network device configures a TCI state pool.

S302. The network device sends a first command to the terminal device.

The first command includes DCI signaling and/or a MAC CE command. The first command is used to indicate at least one TCI state in the TCI state pool, and the at least one TCI state is used to indicate common beam information of a plurality of channels and/or RSs.

S303. The terminal device receives the first command.

S304. The terminal device determines, according to the first command, the at least one TCI state corresponding to a UL and/or a DL.

As can be learned from the embodiments, the network device configures the TCI state pool and sends the first command to the terminal device, where the first command is used to indicate the at least one TCI state in the TCI state pool, and the at least one TCI state is used to indicate the common beam information of the plurality of channels and/or RSs, so that the terminal device can determine, according to the first command, the at least one TCI state corresponding to the UL and/or the DL. Therefore, the network device can implement a unified beam indication mechanism for the plurality of channels and/or RSs, unnecessary signaling overheads are reduced, and the beam indication mechanism is improved.

The following describes the steps of the foregoing beam indication method in detail.

In an embodiment, when configuring the TCI state pool, the network device may configure the TCI state pool for a cell set, where the cell set includes at least one cell.

In an embodiment, before configuring the TCI state pool for the cell set, the network device may configure at least one cell set in cell group configuration information. Based on this, the network device may configure, in the cell group configuration information, the TCI state pool for the cell set.

In an embodiment, if the network device configures only one cell set, the network device configures one TCI state pool for the cell set. If the network device configures a plurality of cell sets, the network device may configure one TCI state pool for each of the plurality of cell sets, or the network device only configures the TCI state pool for a cell set including a plurality of cells. However, for a cell set including only one cell, no TCI state pool may be configured.

In an embodiment, when the network device configures the TCI state pool for the cell set, the network device may configure the TCI state pool for at least one cell in the cell set, or configure the TCI state pool for each cell in the cell set. When the network device configures the TCI state pool for at least one cell in the cell set, the at least one cell may be referred to as a reference cell, and other cells in the cell set than the at least one cell also use the TCI state pool of the at least one cell. When the network device configures a TCI state pool for each cell in the cell set, TCI state pools of the cells are independent of each other.

In an embodiment, the network device configures, in first specified information, the TCI state pool for the cell in the cell set.

The first specified information includes at least one of the following: the cell group configuration information (such as Cell Group Config), cell configuration information of the cell, Bandwidth Part (BWP) configuration information of the cell, Physical Downlink Shared Channel (PDSCH) configuration information of the cell, and Physical Downlink Control Channel (PDCCH) configuration information of the cell.

In an embodiment, considering that at least one cell does not belong to the cell set configured by the network device, the network device may configure a TCI state pool for the cell (cells) that does (do) not belong to the cell set.

In an embodiment, the network device configures, in second specified information, the TCI state pool for the cell not belonging to the cell set.

The second specified information includes at least one of the following: cell configuration information of the cell, BWP configuration information of the cell, PDSCH configuration information of the cell, and PDCCH configuration information of the cell.

As can be learned from the foregoing one or more embodiments, the beam indication method in this application can provide a flexible and complete TCI state pool configuration mode, so that the beam indication mechanism of the network device for the plurality of channels and/or RSs is improved.

In an embodiment, the TCI state includes at least one of the following: a Quasi Co-Location (QCL) type-A RS, a QCL type-B RS, a QCL type-C RS, and a QCL type-D RS.

In an embodiment, in a case that the TCI state includes at least one of the QCL type-A RS, the QCL type-B RS, and the QCL type-C RS, the at least one of the QCL type-A RS, the QCL type-B RS, and the QCL type-C RS is used only for the DL. In a case that the TCI state includes at least one of the QCL type-A RS, the QCL type-B RS, and the QCL type-C RS and includes the QCL type-D RS, the at least one of the QCL type-A RS, the QCL type-B RS, and the QCL type-C RS in the at least one TCI state indicated by the first command is used only for the DL, but the QCL type-D RS may be used for the DL and the UL. After receiving the first command, the terminal device determines, according to the first command, whether each RS in the TCI state indicated by the first command is used for the DL and the UL or used only for the DL.

For example, assuming that the first command indicates the joint TCI state of the DL and the UL from the TCI state pool and that the joint TCI state includes the QCL type-A RS and the QCL type-D RS, the terminal device determines, according to the first command, that the QCL type-D RS is used for the DL and the UL, but the QCL type-A RS is used only for the DL.

For another example, assuming that the first command indicates a separate TCI state for the DL from the TCI state pool and that the separate TCI state includes the QCL type-A RS and the QCL type-D RS, the terminal device determines, according to the first command, that the QCL type-A RS and the QCL type-D RS may be used for the DL. Assuming that the first command indicates a separate TCI state for the UL from the TCI state pool and that the separate TCI state includes the QCL type-A RS and the QCL type-D RS, the terminal device determines, according to the first command, that the QCL type-D RS is used for the UL, where the QCL type-A RS is not applicable to the LL.

In this embodiment, after receiving the first command, the terminal device may determine, according to the first command, whether each RS in the at least one TCI state indicated by the first command is used only for the DL, or used for the DL and the UL.

In an embodiment, the at least one TCI state indicated by the first command is used for the cell corresponding to the TCI state pool; or the at least one TCI state indicated by the first command is used for all cells in the cell set in which the cell corresponding to the TCI state pool is located.

In this embodiment, there is a correspondence between the TCI state pool and the cell. For example, the network device configures TCI state pool 1 for cell a, and configures TCI state pool 2 for cell b. In this case, at least one TCI state in TCI state pool 1 indicated by the first command is used for cell a corresponding to TCI state pool 1, or used for all cells in a cell set in which cell a is located.

In an embodiment, the first command is used to indicate one joint TCI state for the UL and the DL. After receiving the first command, the terminal device determines that the TCI state indicated by the first command is shared by the UL and the DL.

In some alternative embodiments, the first command is used to indicate, for each of the UL and the DL, a separate TCI state corresponding thereto. After receiving the first command, the terminal device determines that a plurality of TCI states indicated by the first command are used for the UL and the DL separately. In an embodiment, before sending the first command to the terminal device, the network device may send a second command first, where the second command is used to indicate that the first command indicates the joint TCI state or the separate TCI state for the UL and the DL. The second command includes DCI signaling and/or a MAC CE command.

The terminal device first receives the second command sent by the network device, and may determine, according to the second command, whether the first command indicates the joint TCI state or the separate TCI state. After receiving the second command, the terminal device receives the first command sent by the network device, to determine the joint TCI state of the UL and the DL or determine the separate TCI state of each of the UL and the DL according to the first command.

In this embodiment, the network device indicates, by using the second command, that the first command indicates the joint TCI state or the separate TCI state for the UL and the DL, so that the two indication modes of the first command can be switched by using the second command. Therefore, the terminal device can conveniently determine, according to the second command and the first command, the at least one TCI state corresponding to the UL and/or the DL, and the beam indication mechanism for the plurality of channels or RSs is improved.

In an embodiment, the first command includes at least one of the following:
 a first signaling field with P first TCI states, where P is a positive integer;
 a second signaling field with Q second TCI states, where Q is a positive integer, and
 first indication information used to indicate whether the second signaling field exists.

In this embodiment, in a case that the first command includes the first indication information, if the first indication information indicates that the second signaling field does not exist, the first signaling field in the first command is used to indicate the joint TCI state of the UL and the DL. If the first indication information indicates that the second signaling field exists, the first signaling field in the first command is used to indicate the separate TCI state corresponding to the DL, and the second signaling field in the first command is used to indicate the separate TCI state corresponding to the UL.

In a single-Transmission and Reception Point (TRP) or single channel group scenario, for a single piece of TRP identification information or a single channel group, the first command includes at least one of the first signaling field, the second signaling field, and the first indication information, and the terminal device may determine, according to indication content of the first command, that is, according to whether the second signaling field exists, that the first command indicates the joint TCI state or the separate TCI state of the UL and the DL.

In some embodiments, for a single piece of TRP identification information or a single channel group, if the first indication information indicates that the second signaling field does not exist, the terminal device may determine that the first command indicates the joint TCI state of the UL and the DL of the TRP identification information or channel group. If the first indication information indicates that the second signaling field exists, the terminal device may determine that the first signaling field in the first command indicates the separate TCI state of the DL of the TRP identification information or channel group, and determine that the second signaling field in the first command indicates the separate TCI state corresponding to the UL of the TRP identification information or channel group.

For example, the first indication information in the first command is 1 bit. When the bit is 1, it indicates that the second signaling field exists in the first command. In this case, the first signaling field in the first command indicates the separate TCI state of the DL, and the second signaling field indicates the separate TCI state of the UL. When the bit is 0, it indicates that the second signaling field does not exist in the first command. In this case, the TCI state indicated by the first signaling field in the first command is the joint TCI state of the DL and the UL.

In an embodiment, for a single piece of TRP identification information or a single channel group, if the first indication information indicates that the second signaling field does not exist, and P in the first signaling field is 1, that is, if the first signaling field indicates only one first TCI state, the terminal device may determine that the first TCI state indicated by the first signaling field is the joint TCI state of the UL and the DL of the TRP identification information or channel group. If the first indication information indicates that the second signaling field exists, and both P and Q are 1, that is, if the first signaling field indicates only one first TCI state, and the second signaling field indicates only one second TCI state, the terminal device may determine that the first TCI state indicated by the first signaling field is the separate TCI state of the DL of the TRP identification information or channel group, and that the second TCI state indicated by the second signaling field is the separate TCI state of the UL of the TRP identification information or channel group.

In an embodiment, if both P and Q in the indication content of the first command are greater than 1, the joint TCI state or the separate TCI state of the UL and the DL may be determined in any one of the following manners:

In a manner, the network device and the terminal device agree on a preset position or number in advance, where the preset position or number is used to locate the joint TCI state of the UL and the DL from the plurality of TCI states, or locate, from the plurality of TCI states, the separate TCI state corresponding to each of the UL and the DL.

In a case that the network device and the terminal device agree on the preset position or number, after the terminal device receives the first command, if the first command includes the first signaling field with the P first TCI states and the second signaling field with the Q second TCI states and both P and Q are greater than 1, the terminal device determines that a first TCI state corresponding to the preset position or number in the first signaling field is the separate TCI state of the DL, and determine that a second TCI state corresponding to the preset position or number in the second signaling field is the separate TCI state of the UL. If the first command includes only the first signaling field with the P first TCI states, and P is greater than 1, the terminal device determines that the first TCI state corresponding to the preset position or number in the first signaling field is the joint TCI state of the UL and the DL.

In another manner, before sending the first command to the terminal device, the network device first sends a third command to the terminal device, where the third command includes DC signaling and/or a MAC CE command.

In a case that the first command includes the first signaling field with the P first TCI states and the second signaling field with the Q second TCI states and that both P and Q are greater than 1, the third command is used to indicate one of the P first TCI states as the separate TCI state of the DL and indicate one of the Q second TCI states as the separate TCI state of the UL.

In a case that the first command includes only the first signaling field with the P first TCI states and that P is greater than 1, the third command is used to indicate one of the P first TCI states as the joint TCI state of the UL and the DL.

Before receiving the first command, the terminal device first receives the third command sent by the network device. The terminal device determines the separate TCI state or the joint TCI state of the UL and the DL according to the third command and the first command.

In an embodiment, in a multi-TRP or multi channel group scenario, the first command is used to indicate at least one TCI state corresponding to each piece of TRP identification information or each channel group. The channel group includes a plurality of channels and/or RSs.

In an embodiment, for any piece of TRP identification information or any one of multiple channel groups, the first command is used to indicate the joint TCI state of the UL and the DL of the TRP identification information or channel group; or the first command is used to indicate the separate TCI state corresponding to each of the UL and the DL of the TRP identification information or channel group.

In an embodiment, before sending the first command to the terminal device, the network device may first send a fourth command to the terminal device. For any piece of TRP identification information or any one of multiple channel groups, the fourth command is used to indicate that the first command indicates the joint TCI state or the separate TCI state for the TRP identification information or channel group. The fourth command includes DCI signaling and/or a MAC CE command.

Before receiving the first command, the terminal device first receives the fourth command sent by the network device. For any piece of TRP identification information or any one of multiple channel groups, the terminal device may determine, according to the fourth command, that the first command indicates the joint TCI state or the separate TCI state for the TRP identification information or channel group. Further, after receiving the first command, the terminal device may determine, according to the first command, the joint TCI state of the UL and the DL of the TRP identification information or channel group, or the separate TCI state corresponding to each of the UL and the DL.

In the multi-TRP or multi channel group scenario, for any piece of TRP identification information or any channel group, the first command may include at least one of the following:

the first signaling field with the P first TCI states, where P is a positive integer;
the second signaling field with the Q second TCI states, where Q is a positive integer; and
the first indication information used to indicate whether the second signaling field exists.

In this embodiment, for any piece of TRP identification information or any channel group, in a case that the first command includes the first indication information, if the first indication information indicates that the second signaling field does not exist, the first signaling field in the first command is used to indicate the joint TCI state of the UL and the DL corresponding to the TRP identification information or channel group. If the first indication information indicates that the second signaling field exists, the first signaling field in the first command is used to indicate the separate TCI state corresponding to the DL corresponding to the TRP identification information or channel group, and the second signaling field in the first command is used to indicate the separate TCI state corresponding to the UL corresponding to the TRP identification information or channel group.

The terminal device determines, according to the indication content of the first command, that is, according to whether the second signaling field exists, that the first command indicates the joint TCI state or the separate TCI state of the UL and the DL. In some embodiments, for any piece of TRP identification information or any channel group, if the first indication information indicates that the second signaling field does not exist, the terminal device may determine that the first command indicates the joint TCI state of the UL and the DL corresponding to the TRP identification information or channel group. If the first indication information indicates that the second signaling field exists, the terminal device may determine that the first signaling field in the first command indicates the separate TCI state of the DL corresponding to the TRP identification information or channel group, and determine that the second signaling field in the first command indicates the separate TCI state corresponding to the UL corresponding to the TRP identification information or channel group.

A multi-TRP scenario is used as an example. It is assumed that the first command includes indication content corresponding to each of TRP 1 and TRP 2, and that the indication content includes at least one of the foregoing first signaling field, second signaling field, and first indication information, and that the indication content corresponding to each of TRP 1 and TRP 2 includes the first indication information. If the first indication information in the indication content corresponding to TRP 1 indicates that the second signaling field does not exist, the terminal device may determine that the first signaling field in the indication content corresponding to TRP 1 indicates a joint TCI state of a UL and a DL of TRP 1. If the first indication information in the indication content corresponding to TRP 2 indicates that the second signaling field exists, the terminal device may determine that the first signaling field in the indication content corresponding to TRP 2 indicates a separate TCI state of a DL of TRP 2, and determine that the second signaling field in the indication content corresponding to TRP 2 indicates a separate TCI state corresponding to a UL of TRP 2.

In the multi-TRP or multi channel group scenario, in a case that there is the indication content corresponding to the TRP identification information or channel group in the first command and that the indication content includes the first indication information, depending on whether the first indication information indicates that the second signaling field exists and different values of P and Q, a manner of determining, by the terminal device, the TCI state corresponding to the TRP identification information or channel group also varies.

TRP 1 in the multi-TRP or multi channel group scenario is used as an example. If the first indication information in the indication content corresponding to TRP 1 indicates that the second signaling field does not exist, and P in the first signaling field is 1, that is, if the first signaling field indicates only one first TCI state, the terminal device may determine that the first TCI state indicated by the first signaling field is the joint TCI state of the UL and the DL of TRP 1. If the first indication information indicates that the second signaling field exists, and both P and Q are 1, that is, if the first signaling field indicates only one first TCI state, and the second signaling field indicates only one second TCI state, the terminal device may determine that the first TCI state indicated by the first signaling field is a separate TCI state of the DL of TRP 1, and that the second TCI state indicated by the second signaling field is a separate TCI state of the UL of TRP 1.

If both P and Q in the indication content corresponding to TRP 1 are greater than 1, the joint TCI state or the separate TCI state of the UL and the DL of TRP 1 may be determined in any one of the following manners:

In a manner, the network device and the terminal device agree on a preset position or number in advance, where the preset position or number is used to locate the joint TCI state of the UL and the DL from the plurality of TCI states, or locate, from the plurality of TCI states, the separate TCI state corresponding to each of the UL and the DL.

In a case that the network device and the terminal device agree on the preset position or number, after the terminal device receives the first command, if the first command includes the first signaling field with the P first TCI states and the second signaling field with the Q second TCI states and both P and Q are greater than 1, the terminal device determines that a first TCI state corresponding to the preset position or number in the first signaling field is the separate TCI state of the DL of TRP 1, and determine that a second TCI state corresponding to the preset position or number in the second signaling field is the separate TCI state of the UL of TRP 1. If the first command includes only the first signaling field with the P first TCI states, and P is greater than 1, the terminal device determines that the first TCI state corresponding to the preset position or number in the first signaling field is the joint TCI state of the UL and the DL of TRP 1.

In another manner, before sending the first command to the terminal device, the network device first sends a third command to the terminal device, where the third command includes DCI signaling and/or a MAC CE command.

In a case that the indication content of TRP 1 includes the first signaling field with the P first TCI states and the second signaling field with the Q second TCI states and that both P) and Q are greater than 1, the third command is used to indicate one of the P first TCI states as the separate TCI state of the DL of TRP 1 and indicate one of the Q second TCI states as the separate TCI state of the UL of TRP 1.

In a case that the indication content of TRP 1 includes only the first signaling field with the P first TCI states and that P is greater than 1, the third command is used to indicate one of the P first TCI states as the joint TCI state of the UL and the DL of TRP 1.

It should be noted that TRP 1 is only an example. For any piece of TRP identification information or any channel group in the multi-TRP or multi channel group scenario, the TCI state corresponding to the TRP identification information or channel group may be determined in the same way as the TCI state corresponding to TRP 1. Details are not described herein again.

After receiving the first command sent by the network device, the terminal device first determines, according to the first command, the identification and/or the indication content corresponding to the TRP identification information or channel group, and further determines, according to the identification and/or the indication content corresponding to the TRP identification information or channel group, the TCI state corresponding to the TRP identification information or channel group. The indication content includes at least one of the first signaling field, the second signaling field, and the first indication information.

In an embodiment, for any piece of TRP identification information or any one of multiple channel groups, when the first command indicates a TCI state for each piece of TRP identification information or each of the multiple channel groups, an indication mode may be any one of the following.

Mode 1: The first command includes each piece of TRP identification information or each channel group identification, and indication content corresponding to each identification.

If the first command uses the mode 1 for indication, after receiving the first command, the terminal device may determine, according to each piece of TRP identification information or each channel group identification in the first command, an identification and/or indication content corresponding to each piece of TRP identification information or each channel group.

Mode 2: The first command includes at least one group of indication content corresponding to the TRP identification information or channel group, and does not include the TRP identification information or a channel group identification.

If the first command uses the mode 2 for indication, after receiving the first command, the terminal device may determine, according to an arrangement sequence or position of each group of indication content in the first command, an identification and/or indication content corresponding to each piece of TRP identification information or each channel group.

TRP identification information is used as an example. Assuming that the first command includes two groups of indication content but does not include TRP identification information and that the two groups of indication content are sequentially represented as indication content group A and indication content group B, after receiving the first command, the terminal device determines, according to the arrangement sequence of each group of indication content in the first command, that indication content group A is an identification and/or indication content corresponding to TRP 1 (TRP identification information), and determines that indication content group B is an identification and/or indication content corresponding to TRP 2 (TRP identification information).

Mode 3: There are a plurality of first commands, and each first command includes one piece of TRP identification information or one channel group identification and corresponding indication content.

If the first command uses the mode 3 for indication, after receiving the first command, the terminal device may determine, according to each piece of TRP identification information or each channel group identification in the first command, the identification and/or indication content corresponding to each piece of TRP identification information or each channel group.

Mode 4: There are a plurality of first commands, and each first command includes indication content corresponding to one piece of TRP identification information or one channel group, and does not include the TRP identification information or a channel group identification.

If the first command uses the mode 4 for indication, after receiving the first command, the terminal device may determine, according to at least one of time domain information, frequency domain information, and code domain information in each first command, the identification and/or indication content corresponding to each piece of TRP identification information or each channel group.

In this embodiment, the indication content includes at least one of the first signaling field with the P first TCI states, the second signaling field with the Q second TCI states, and the first indication information used to indicate whether the second signaling field exists. Both P and Q are positive integers.

In an embodiment, the first command further includes second indication information corresponding to the TRP identification information or channel group identification and/or the indication content, where the second indication information is used to indicate whether there is the corresponding TRP identification information or channel group identification and/or the corresponding indication content in the first command. After receiving the first command, the terminal device may determine, according to the second indication information, whether there is the corresponding TRP identification information or channel group identification and/or whether there is the indication content corresponding to the TRP identification information or the channel group identification in the first command.

In some embodiments, in a case that the first command includes each piece of TRP identification information or each channel group identification and the indication content corresponding to each identification, if the second indication information indicates that there is the corresponding TRP identification information or channel group identification and/or the indication content corresponding to the identification in the first command, the terminal device determines that there is the TRP identification information or channel group identification and the corresponding indication content in the first command, and determines that there is the TCI state of the TRP identification information or channel group in the first command, or if the second indication information indicates that there is not the corresponding TRP identification information or channel group identification and/or the indication content corresponding to the identification in the first command, the terminal device determines that there is not the TRP identification information or channel group identification and the corresponding indication content in the first command, and determines that there is not the TCI state of the TRP identification information or channel group in the first command.

For example, the second indication information corresponding to each piece of TRP identification information or each channel group may be 1 bit, and the bit is 1 or 0, used to indicate whether there is the corresponding TRP identification information or channel group identification and the corresponding indication content in the first command.

If the first command is used to indicate the TCI states of TRP 1 and TRP 2, the first command includes 1-bit second indication information A corresponding to TRP 1 and 1-bit second indication information B corresponding to TRP 2 If the second indication information A is 1, it indicates that there is the TCI state of TRP 1 in the first command; otherwise, if the second indication information A is 0, it indicates that there is not the TCI state of TRP 1 in the first command. The second indication information B is similar to the second indication information A, and a value 1 or 0 of the second indication information B may also be used to indicate whether there is the TCI state of TRP 2 in the first command. As can be learned from the foregoing one or more embodiments, the technical solution provided in this application can provide a flexible and complete beam indication mode for the multi-TRP or multi channel group scenario, so that the beam indication mechanism of the network device for the plurality of channels and/or RSs is improved.

Figure 4:
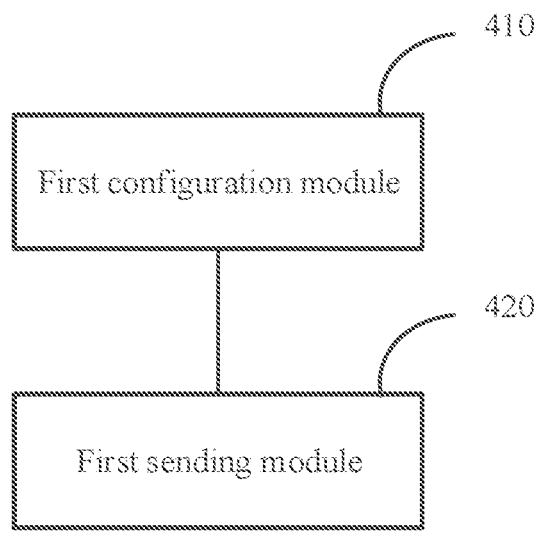
FIG. 4 is a schematic block diagram of a network device according to an embodiment of this application.

FIG. 4 is a schematic block diagram of a network device according to an embodiment of this application. As shown in FIG. 4, the network device includes:

a first configuration module 410, configured to configure a TCI state pool, where the TCI state pool includes a plurality of TCI states; and a first sending module 420, configured to send a first command to a terminal device, where the first command is used to indicate at least one TCI state in the TCI state pool, the at least one TCI state is used to indicate common beam information of a plurality of channels and/or RSs, and the at least one TCI state includes a joint TCI state and/or a separate TCI state.

In an embodiment, the first command includes downlink control information DCI signaling and/or a media access control MAC control element CE command.

In an embodiment, the first configuration module 410 includes:

a first configuration unit, configured to configure the TCI state pool for a cell set, where the cell set includes at least one cell.

In an embodiment, the first configuration module 410 further includes:

a second configuration unit, configured to configure at least one cell set in cell group configuration information before the TCI state pool is configured for the cell set, where the first configuration unit is further configured to configure, in the cell group configuration information, the TCI state pool for the cell set.

In an embodiment, the first configuration unit is further configured to:

configure one TCI state pool for each cell set, or configure the TCI state pool only for the cell set including a plurality of cells.

In an embodiment, the first configuration unit is further configured to:

configure the TCI state pool for the at least one cell in the cell set;

or configure the TCI state pool for each cell in the cell set.

In an embodiment, the first configuration unit is further configured to:

configure, in first specified information, the TCI state pool for the cell in the cell set, where the first specified information includes at least one of the following: the cell group configuration information, cell configuration information of the cell, bandwidth part BWP configuration information of the cell, physical downlink shared channel PDSCH configuration information of the cell, and physical downlink control channel PDCCH configuration information of the cell.

In an embodiment, the first configuration module 410 further includes.

a third configuration unit, configured to configure the TCI state pool for a cell not belonging to the cell set.

In an embodiment, the third configuration unit is further configured to:

configure, in second specified information, the TCI state pool for the cell not belonging to the cell set, where the second specified information includes at least one of the following: cell configuration information of the cell, BWP configuration information of the cell, PDSCH configuration information of the cell, and PDCCH configuration information of the cell.

In an embodiment, in a case that the TCI state includes at least one of a QCL type-A RS, a QCL type-B RS, and a QCL type-C RS, the at least one of the QCL type-A RS, the QCL type-B RS, and the QCL type-C RS is used only for a downlink DL.

In an embodiment, the at least one TCI state is used for the cell corresponding to the TCI state pool; or the at least one TCI state is used for all cells in the cell set in which the cell corresponding to the TCI state pool is located.

In an embodiment, the first command is used to indicate one joint TCI state for a UL and the DL; or the first command is used to indicate, for each of the UL and the DL, the separate TCI state corresponding thereto.

In an embodiment, the network device further includes:
a second sending module, configured to send a second command to the terminal device before the first command is sent to the terminal device, where the second command is used to indicate that the first command indicates the joint TCI state or the separate TCI state for the UL and the DL, and the second command includes DCI signaling and/or a MAC CE command.

In an embodiment, the first command includes at least one of the following:
a first signaling field with P first TCI states, where P is a positive integer,
a second signaling field with Q second TCI states, where Q is a positive integer; and
first indication information used to indicate whether the second signaling field exists.

In an embodiment, the network device further includes:
a first agreement module, configured to agree on a preset position or number with the terminal device before the first command is sent to the terminal device, where the preset position or number is used to locate the joint TCI state of the UL and the DL from the plurality of TCI states, or locate, from the plurality of TCI states, the separate TCI state corresponding to each of the UL and the DL.

In an embodiment, the network device further includes:
a third sending module, configured to send a third command to the terminal device before the first command is sent to the terminal device, where the third command includes DCI signaling and/or a MAC CE command, where
in a case that the first command includes the first signaling field and the second signaling field and that both P and Q are greater than 1, the third command is used to indicate one of the first TCI states as the separate TCI state of the DL and indicate one of the second TCI states as the separate TCI state of the UL; or
in a case that the first command includes only the first signaling field and that P is greater than 1, the third command is used to indicate one of the first TCI states as the joint TCI state of the UL and the DL.

In an embodiment, in a multi transmission and reception point TRP or multi channel group scenario, the first command is used to indicate at least one TCI state corresponding to each piece of TRP identification information or each channel group, where the channel group includes a plurality of channels and/or RSs.

In an embodiment, for any piece of TRP identification information or any one of multiple channel groups, the first command is used to indicate the joint TCI state of the LL and the DL of the TRP identification information or channel group, or the first command is used to indicate the separate TCI state corresponding to each of the UL and the DL of the TRP identification information or channel group.

In an embodiment, the network device further includes:
a fourth sending module, configured to send a fourth command to the terminal device before the first command is sent to the terminal device, where the fourth command is used to indicate that the first command indicates the joint TCI state or the separate TCI state for the TRP identification information or channel group, where
the fourth command includes DCI signaling and/or a MAC CE command.

In an embodiment, the first command includes each piece of TRP identification information or each channel group identification, and indication content corresponding to each identification:
or
the first command includes at least one group of indication content corresponding to the TRP identification information or channel group, and does not include the TRP identification information or a channel group identification;
or
there are a plurality of first commands, and each first command includes one piece of TRP identification information or one channel group identification and corresponding indication content;
or
there are a plurality of first commands, and each first command includes indication content corresponding to one piece of TRP identification information or one channel group, and does not include the TRP identification information or a channel group identification, where
the indication content includes at least one of the first signaling field, the second signaling field, and the first indication information.

In an embodiment, the first command further includes second indication information corresponding to the TRP identification information or channel group identification and/or the indication content; and
the second indication information is used to indicate whether there is the corresponding TRP identification information or channel group identification and/or the indication content corresponding to each identification in the first command.

In an embodiment, the first command includes the first indication information; and
if the first indication information indicates that the second signaling field does not exist, the first signaling field in the first command is used to indicate the joint TCI state of the UL and the DL; or
if the first indication information indicates that the second signaling field exists, the first signaling field in the first command is used to indicate the separate TCI state corresponding to the DL, and the second signaling field in the first command is used to indicate the separate TCI state corresponding to the UL.

According to one or more embodiments of this application, the network device configures the TCI state pool and sends the first command to the terminal device, where the first command is used to indicate the at least one TCI state in the TCI state pool, and the at least one TCI state is used to indicate the common beam information of the plurality of channels and/or RSs, so that the terminal device can determine, according to the first command, the at least one TCI state corresponding to the U. and/or the DL. Therefore, the network device can implement a unified beam indication mechanism for the plurality of channels and/or RSs, unnecessary signaling overheads are reduced, and the beam indication mechanism is improved.

The network device provided in this embodiment of this application can implement each process implemented by the network device in the method embodiments in FIG. 1 to FIG. 3. To avoid repetition, details are not described herein again.

Figure 5:
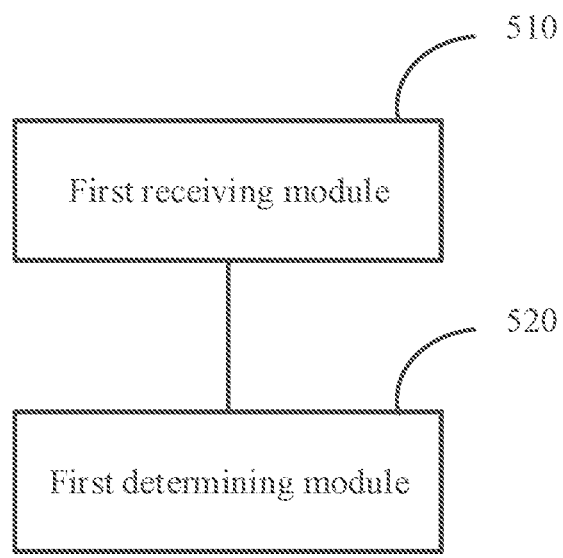
FIG. 5 is a schematic block diagram of a terminal device according to an embodiment of this application.

FIG. 5 is a schematic block diagram of a terminal device according to an embodiment of this application. As shown in FIG. 5, the terminal device includes:

- a first receiving module 510, configured to receive a first command sent by a network device, where the first command is used to indicate at least one TCI state in a TCI state pool, the at least one TCI state includes a joint TCI state and/or a separate TCI state, the TCI state pool is preconfigured by the network device, and the at least one TCI state is used to indicate common beam information of a plurality of channels and/or RSs; and
- a first determining module 520, configured to determine, according to the first command, the at least one TCI state corresponding to a UL and/or a DL.

In an embodiment, the first command includes DCI signaling and/or a MAC CE command.

In an embodiment, the first determining module 520 includes:

- a first determining unit, configured to: in a case that the TCI state includes at least one of a QCL type-A RS, a QCL type-B RS, and a QCL type-C RS, determine that the at least one of the QCL type-A RS, the QCL type-B RS, and the QCL type-C RS is used only for the DL.

In an embodiment, the first command is used to indicate one joint TCI state for the UL and the DL; or the first command is used to indicate, for each of the UL and the DL, the separate TCI state corresponding thereto.

In an embodiment, the terminal device further includes:

- a second receiving module, configured to: before the first command sent by the network device is received, receive a second command sent by the network device, where the second command is used to indicate that the first command indicates the joint TCI state or the separate TCI state for the UL and the DL, and the second command includes DCI signaling and/or a MAC CE command.

In an embodiment, the first command includes at least one of the following:

- a first signaling field with P first TCI states, where P is a positive integer;
- a second signaling field with Q second TCI states, where Q is a positive integer; and
- first indication information used to indicate whether the second signaling field exists.

In an embodiment, the terminal device further includes:

- a second agreement module, configured to agree on a preset position or number with the network device before the first command sent by the network device is received, where the preset position or number is used to locate the joint ICI state of the UL and the DL from a plurality of TCI states, or locate, from a plurality of TCI states, the separate TCI state corresponding to each of the UL and the DL.

In an embodiment, the first determining module 520 includes:

- a second determining unit, configured to: in a case that the first command includes the first signaling field and the second signaling field and that both P and Q are greater than 1, determine that a first TCI state corresponding to the preset position or number in the first signaling field is the separate TCI state of the DL, and determine that a second TCI state corresponding to the preset position or number in the second signaling field is the separate TCI state of the UL; or
- a third determining unit, configured to: in a case that the first command includes only the first signaling field and that P is greater than 1, determine that a first TCI state corresponding to the preset position or number in the first signaling field is the joint TCI state of the UL and the DL.

In an embodiment, the terminal device further includes:

- a third receiving module, configured to: before the first command sent by the network device is received, receive a third command sent by the network device, where the third command includes DCI signaling and/or a MAC CE command; and
- a second determining module, configured to determine the separate TCI state or the joint TCI state of the UL and the DL according to the third command, where
- in a case that the first command includes the first signaling field and the second signaling field and that both P and Q are greater than 1, the third command is used to indicate one of the first TCI states as the separate TCI state of the DL and indicate one of the second TCI states as the separate TCI state of the UL; or in a case that the first command includes only the first signaling field and that P is greater than 1, the third command is used to indicate one of the first TCI states as the joint TCI state of the UL and the DL.

In an embodiment, in a multi transmission and reception point TRP or multi channel group scenario, the first command is used to indicate at least one TCI state corresponding to each piece of TRP identification information or each channel group, where the channel group includes a plurality of channels and/or RSs.

In an embodiment, for any piece of TRP identification information or any channel group, the first command is used to indicate the joint TCI state of the UL and the DL of the TRP identification information or channel group; or the first command is used to indicate the separate TCI state corresponding to each of the UL and the DL of the TRP identification information or channel group.

In an embodiment, the terminal device further includes:

- a fourth receiving module, configured to: before the first command sent by the network device is received, receive a fourth command sent by the network device, where the fourth command is used to indicate that the first command indicates the joint TCI state or the separate TCI state for the TRP identification information or channel group, and the fourth command includes DCI signaling and/or a MAC CE command.

In an embodiment, the first determining module 520 includes:

- a fourth determining unit, configured to determine each piece of TRP identification information or each channel group identification and/or corresponding indication content according to the first command, where the indication content includes at least one of the first signaling field, the second signaling field, and the first indication information; and
- a fifth determining unit, configured to determine, according to each piece of TRP identification information or each channel group identification and/or the corresponding indication content, at least one TCI state corresponding to each piece of TRP identification information or each channel group.

In an embodiment, the fourth determining unit is further configured to
- if the first command includes each piece of TRP identification information or each channel group identification, and indication content corresponding to each identification, determine each piece of TRP identification information or each channel group identification and/or the corresponding indication content according to each piece of TRP identification information or each channel group identification in the first command,
- if the first command includes at least one group of indication content corresponding to the TRP identification information or channel group, and does not include the TRP identification information or a channel group identification, determine each piece of TRP identification information or each channel group identification and/or the corresponding indication content according to an arrangement sequence or position of each group of indication content in the first command;
- if there are a plurality of first commands, and each first command includes one piece of TRP identification information or one channel group identification and corresponding indication content, determine each piece of TRP identification information or each channel group identification and/or the corresponding indication content according to each identification included in the first command; or
- if there are a plurality of first commands, and each first command includes indication content corresponding to one piece of TRP identification information or one channel group, and does not include the TRP identification information or a channel group identification, determine each piece of TRP identification information or each channel group identification and/or the corresponding indication content according to at least one of time domain information, frequency domain information, and code domain information in each first command.

In an embodiment, the first command further includes second indication information corresponding to the TRP identification information or channel group identification and/or the indication content; and
the fourth determining unit is further configured to:
- if the second indication information indicates that there is the corresponding TRP identification information or channel group identification and/or the indication content in the first command, determine that there is the TRP identification information or channel group identification and/or the corresponding indication content in the first command; or
- if the second indication information indicates that there is not the corresponding TRP identification information or channel group identification and/or the indication content in the first command, determine that there is not the TRP identification information or channel group identification and/or the corresponding indication content in the first command.

In an embodiment, the first determining module includes:
a sixth determining unit, configured to: if the first indication information indicates that the second signaling field does not exist, determine that the first TCI state in the first signaling field is the joint TCI state of the UL and the DL; or a seventh determining unit, configured to: if the first indication information indicates that the second signaling field exists, determine that the first TCI state in the first signaling field is the separate TCI state corresponding to the DL, and determine that the second TCI state in the second signaling field is the separate TCI state corresponding to the UL.

As can be learned from the embodiments, the network device configures the TCI state pool and sends the first command to the terminal device, where the first command is used to indicate the at least one TCI state in the TCI state pool, and the at least one TCI state is used to indicate the common beam information of the plurality of channels and/or RSs, so that the terminal device can determine, according to the first command, the at least one TCI state corresponding to the UL and/or the DL. Therefore, the network device can implement a unified beam indication mechanism for the plurality of channels and/or RSs, unnecessary signaling overheads are reduced, and the beam indication mechanism is improved.

The terminal device provided in this embodiment of this application can implement each process implemented by the terminal device in the method embodiments in FIG. 1 to FIG. 3. To avoid repetition, details are not described herein again.

Figure 6:
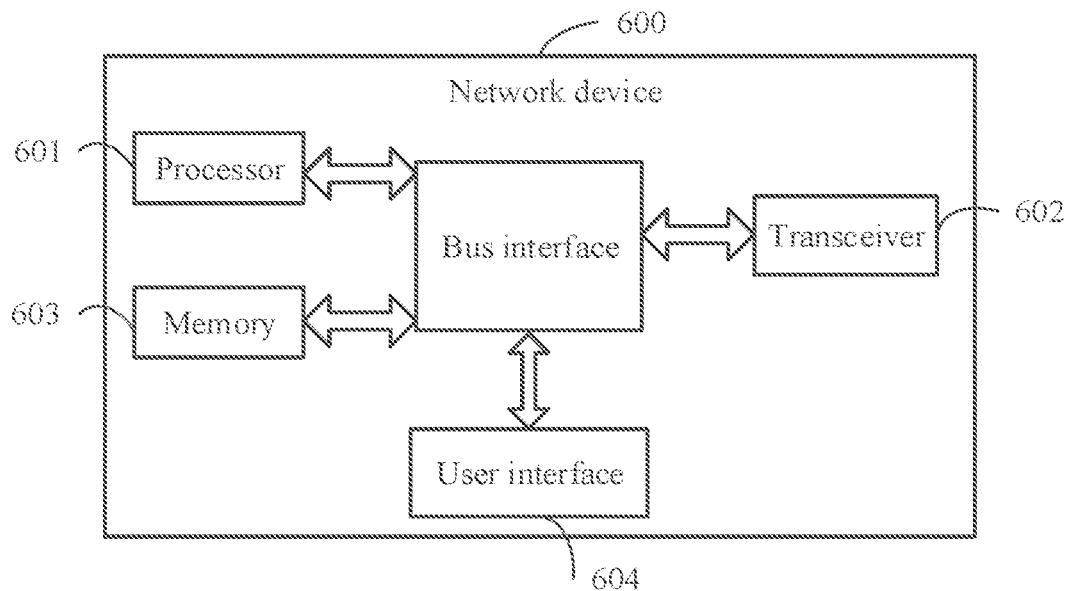
FIG. 6 is a schematic structural diagram of a network device according to an embodiment of this application.

FIG. 6 is a structural diagram of a network device to which the embodiments of the present disclosure are applied. Details of the beam indication method performed by the network device in the foregoing embodiment can be implemented, with the same effect achieved. As shown in FIG. 6, the network device 600 includes a processor 601, a transceiver 602, a memory 603, a user interface 604, and a bus interface.

In this embodiment of the present disclosure, the network device 600 further includes a computer program stored in the memory 603 and capable of running on the processor 601. When the computer program is executed by the processor 601, the following steps are implemented:
- configuring a TCI state pool, where the TCI state pool includes a plurality of TCI states; and
- sending a first command to a terminal device, where the first command is used to indicate at least one TCI state in the TCI state pool, the at least one TCI state is used to indicate common beam information of a plurality of channels and/or RSs, and the at least one TCI state includes a joint TCI state and/or a separate TCI state.

In FIG. 6, a bus architecture may include any quantity of interconnected buses and bridges, and connects together circuits that are of one or more processors represented by the processor 601 and of a memory represented by the memory 603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, including a transmitter and a receiver, and provides units for communicating with a variety of other apparatuses on a transmission medium. For different user equipment, the user interface 604 may also be an interface that can be externally or internally connected to a required device. The connected device includes but is not limited to a keypad, a display, a speaker, a microphone, a joystick, and the like.

The processor 601 is responsible for management of the bus architecture and general processing, and the memory 603 is capable of storing data that is used by the processor 601 during an operation.

In some embodiments, the first command includes downlink control information DCI signaling and/or a media access control MAC control element CE command.

In some embodiments, when the computer program is executed by the processor 601, the following step may be further implemented:
configuring the TCI state pool for a cell set, where the cell set includes at least one cell.

In some embodiments, when the computer program is executed by the processor 601, the following steps may be further implemented:
before configuring the ICI state pool for the cell set, configuring at least one cell set in cell group configuration information; and
configuring, in the cell group configuration information, the TCI state pool for the cell set.

In some embodiments, when the computer program is executed by the processor 601, the following step may be further implemented:
configuring one TCI state pool for each cell set,
or
configuring the TCI state pool only for the cell set including a plurality of cells.

In some embodiments, when the computer program is executed by the processor 601, the following step may be further implemented:
configuring the TCI state pool for the at least one cell in the cell set;
or
configuring the TCI state pool for each cell in the cell set.

In some embodiments, when the computer program is executed by the processor 601, the following step may be further implemented:
configuring, in first specified information, the TCI state pool for the cell in the cell set, where the first specified information includes at least one of the following: the cell group configuration information, cell configuration information of the cell, bandwidth part BWP configuration information of the cell, physical downlink shared channel PDSCH configuration information of the cell, and physical downlink control channel PDCCH configuration information of the cell.

In some embodiments, when the computer program is executed by the processor 601, the following step may be further implemented:
configuring the TCI state pool for a cell not belonging to the cell set.

In some embodiments, when the computer program is executed by the processor 601, the following step may be further implemented:
configuring, in second specified information, the TCI state pool for the cell not belonging to the cell set, where the second specified information includes at least one of the following: cell configuration information of the cell, BWP configuration information of the cell, PDSCH configuration information of the cell, and PDCCH configuration information of the cell.

In some embodiments, in a case that the TCI state includes at least one of a QCL type-A RS, a QCL type-B RS, and a QCL type-C RS, the at least one of the QCL type-A RS, the QCL type-B RS, and the QCL type-C RS is used only for a DL.

In some embodiments, the at least one TCI state is used for the cell corresponding to the TCI state pool; or the at least one TCI state is used for all cells in the cell set in which the cell corresponding to the TCI state pool is located.

In some embodiments, the first command is used to indicate one joint TCI state for a UL and the DL, or the first command is used to indicate, for each of the UL, and the DL, the separate TCI state corresponding thereto.

In some embodiments, when the computer program is executed by the processor 601, the following step may be further implemented:
sending a second command to the terminal device, where the second command is used to indicate that the first command indicates the joint TCI state or the separate TCI state for the UL and the DL, and the second command includes DCI signaling and/or a MAC CE command.

In some embodiments, the first command includes at least one of the following:
a first signaling field with P first TCI states, where P is a positive integer;
a second signaling field with Q second TCI states, where Q is a positive integer; and
first indication information used to indicate whether the second signaling field exists.

In some embodiments, when the computer program is executed by the processor 601, the following step may be further implemented:
before sending the first command to the terminal device, agreeing on a preset position or number with the terminal device, where the preset position or number is used to locate the joint TCI state of the UL and the DL from the plurality of TCI states, or locate, from the plurality of TCI states, the separate TCI state corresponding to each of the UL and the DL.

In some embodiments, when the computer program is executed by the processor 601, the following step may be further implemented:
before sending the first command to the terminal device, sending a third command to the terminal device, where the third command includes DCI signaling and/or a MAC CE command, where
in a case that the first command includes the first signaling field and the second signaling field and that both P and Q are greater than 1, the third command is used to indicate one of the first TCI states as the separate TCI state of the DL and indicate one of the second TCI states as the separate TCI state of the UL; or
in a case that the first command includes only the first signaling field and that P is greater than 1, the third command is used to indicate one of the first TCI states as the joint TCI state of the UL and the DL.

In some embodiments, in a multi TRP or multi channel group scenario, the first command is used to indicate at least one TCI state corresponding to each piece of TRP identification information or each channel group, where the channel group includes a plurality of channels and/or RSs.

In some embodiments, for any piece of TRP identification information or any one of multiple channel groups, the first command is used to indicate the joint TCI state of the UL and the DL, of the TRP identification information or channel group; or the first command is used to indicate the separate TCI state corresponding to each of the UL and the DL of the TRP identification information or channel group.

In some embodiments, when the computer program is executed by the processor 601, the following step may be further implemented:
before sending the first command to the terminal device, sending a fourth command to the terminal device, where the fourth command is used to indicate that the first command indicates the joint TCI state or the separate TCI state for the TRP identification information or channel group, where
the fourth command includes DCI signaling and/or a MAC CE command.

In some embodiments, the first command includes each piece of TRP identification information or each channel group identification, and indication content corresponding to each identification,
or
the first command includes at least one group of indication content corresponding to the TRP identification information or channel group, and does not include the TRP identification information or a channel group identification;
or
there are a plurality of first commands, and each first command includes one piece of TRP identification information or one channel group identification and corresponding indication content;
or
there are a plurality of first commands, and each first command includes indication content corresponding to one piece of TRP identification information or one channel group, and does not include the TRP identification information or a channel group identification, where
the indication content includes at least one of the first signaling field, the second signaling field, and the first indication information.

In some embodiments, the first command further includes second indication information corresponding to the TRP identification information or channel group identification and/or the indication content; and
the second indication information is used to indicate whether there is the corresponding TRP identification information or channel group identification and/or the indication content in the first command.

In some embodiments, the first command includes the first indication information, and
if the first indication information indicates that the second signaling field does not exist, the first signaling field in the first command is used to indicate the joint TCI state of the UL and the DL; or
if the first indication information indicates that the second signaling field exists, the first signaling field in the first command is used to indicate the separate TCI state corresponding to the DL, and the second signaling field in the first command is used to indicate the separate TCI state corresponding to the UL.

In this embodiment of this application, the network device configures the TCI state pool and sends the first command to the terminal device, where the first command is used to indicate the at least one TCI state in the TCI state pool, and the at least one TCI state is used to indicate the common beam information of the plurality of channels and/or RSs, so that the terminal device can determine, according to the first command, the at least one TCI state corresponding to the LL and/or the DL. Therefore, the network device can implement a unified beam indication mechanism for the plurality of channels and/or RSs, unnecessary signaling overheads are reduced, and the beam indication mechanism is improved.

Figure 7:
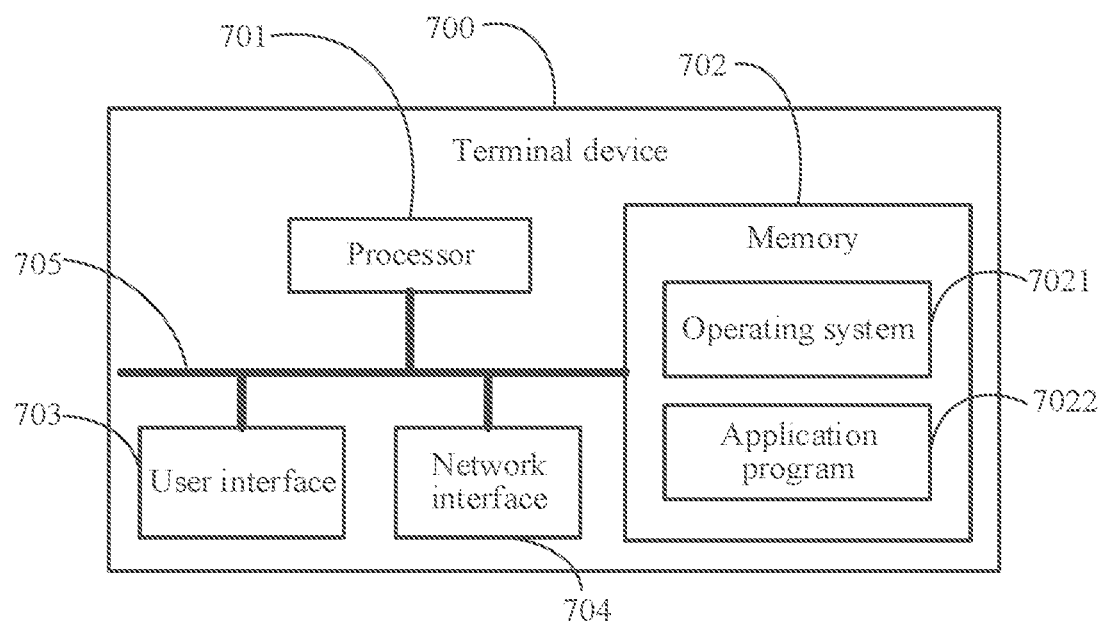
FIG. 7 is a schematic structural diagram of a terminal device according to an embodiment of this application.

FIG. 7 is a block diagram of a terminal device according to another embodiment of the present disclosure. The terminal device 700 shown in FIG. 7 includes at least one processor 701, a memory 702, at least one network interface 704, and a user interface 703. The components of the terminal device 700 are coupled together by using a bus system 705. It can be understood that the bus system 705 is configured to implement connection communication between these components. The bus system 705 may include not only a data bus but also a power supply bus, a control bus, and a status signal bus. However, for clarity of description, various types of buses in FIG. 7 are marked as the bus system 705.

The user interface 703 may include a display, a keyboard, a click device (for example, a mouse or a trackball), a touch board, or a touchscreen.

It can be understood that the memory 702 in this embodiment of the present disclosure may be a volatile memory or a nonvolatile memory, or may include both a volatile memory and a nonvolatile memory. The nonvolatile memory may be a Read-Only Memory (ROM), a Programmable ROM (PROM), an Erasable PROM (EPROM), and an Electrically EPROM (EEPROM), or flash memory. The volatile memory may be a Random Access Memory (RAM), which is used as an external cache. As exemplary rather than restrictive description, many forms of RAM can be used, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchronous Link DRAM (Synchlink DRAM or SLDRAM), and a Direct Rambus RAM (DRRAM). The memory 702 in the system and method described in the embodiments of the present disclosure is intended to include but is not limited to these and any other suitable types of memories.

In some implementations, the memory 702 stores the following elements an executable module or a data structure, or a subset thereof, or an extended set thereof: an operating system 7021 and an application program 7022.

The operating system 7021 includes various system programs, such as a framework layer, a kernel library layer, and a driver layer, and is configured to implement various basic services and process hardware-based tasks. The application program 7022 includes various application programs, such as a media player, and a browser, and is configured to implement various application services. A program for implementing the methods of the embodiments of the present disclosure may be included in the application program 7022.

In this embodiment of the present disclosure, the terminal device 700 further includes a computer program stored in the memory 702 and capable of running on the processor 701. When the computer program is executed by the processor 701, the following steps are implemented.
receiving a first command sent by a network device, where the first command is used to indicate at least one TCI state in a TCI state pool, the at least one TCI state includes a joint TCI state and/or a separate TCI state, the TCI state pool is preconfigured by the network device, and the at least one TCI state is used to indicate common beam information of a plurality of channels and/or RSs, and
determining, according to the first command, the at least one TCI state corresponding to a UL and/or a DL.

The method disclosed in the embodiments of the present disclosure is applicable to the processor 701, or implemented by the processor 701. The processor 701 may be an integrated circuit chip with a signal processing capability. In an implementation process, the steps of the foregoing method can be implemented by using a hardware integrated logical circuit in the processor 701, or by using instructions in a form of software. The processor 701 may be a general-purpose processor, a Digital Signal Processor (DSP), an Application Specific Integrated Circuit (ASIC), a Field Programmable Gate Array (FPGA) or another programmable logical device, a discrete gate or transistor logical device, or a discrete hardware component. It may implement or perform the methods, the steps, and logical block diagrams that are disclosed in the embodiments of the present disclosure. The general-purpose processor may be a microprocessor, or the processor may also be any conventional processor or the like. The steps of the methods disclosed with reference to the embodiments of the present disclosure may be directly performed by a hardware decoding processor, or may be performed by using a combination of hardware and software modules in the decoding processor. The software module may be located in a computer readable storage medium that is mature in the art, such as a random access memory, a flash memory, a read-only memory, a programmable read-only memory, or an electrically erasable programmable memory, or a register. The computer readable storage medium is located in the memory 702, and the processor 701 reads information in the memory 702 and implements, in combination with its hardware, the steps of the foregoing methods. For example, a computer program is stored in the computer-readable storage medium, and when the computer program is executed by the processor 701, the steps of the embodiments of the foregoing method for beam indication are implemented.

It can be understood that the embodiments described in the present disclosure may be implemented by hardware, software, firmware, middleware, microcode, or a combination thereof. For hardware implementation, the processing unit may be implemented in one or more ASICs, DSPs, DSP Devices (DSPDs), Programmable Logic Devices (PLDs), FPGAs, general-purpose processors, controllers, microcontrollers, microprocessors, and other electronic units for performing the functions described in the present disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor The memory may be implemented in or outside the processor.

In some embodiments, the first command includes DCI signaling and/or a MAC CE command.

In some embodiments, the TCI state includes at least one of the following: a quasi-colocation QCL type-A RS, a QCL type-B RS, a QCL type-C RS, and a QCL type-D RS.

In some embodiments, when the computer program is executed by the processor 701, the following step may be further implemented:

in a case that the TCI state includes at least one of a QCL type-A RS, a QCL type-B RS, and a QCL type-C RS, determining that the at least one of the QCL type-A RS, the QCL type-B RS, and the QCL type-C RS is used only for the DL.

In some embodiments, the first command is used to indicate one joint TCI state for the UL and the DL; or the first command is used to indicate, for each of the UL and the DL, the separate TCI state corresponding thereto.

In some embodiments, when the computer program is executed by the processor 701, the following step may be further implemented:

before receiving the first command sent by the network device, receiving a second command sent by the network device, where the second command is used to indicate that the first command indicates the joint TCI state or the separate TCI state for the UL and the DL, and the second command includes DCI signaling and/or a MAC CE command.

In some embodiments, the first command includes at least one of the following:

a first signaling field with P first TCI states, where P is a positive integer;

a second signaling field with Q second TCI states, where Q is a positive integer, and first indication information used to indicate whether the second signaling field exists.

In some embodiments, when the computer program is executed by the processor 701, the following step may be further implemented:

before receiving the first command sent by the network device, agreeing on a preset position or number with the network device, where the preset position or number is used to locate the joint TCI state of the UL and the DL from a plurality of TCI states, or locate, from a plurality of TCI states, the separate TCI state corresponding to each of the UL and the DL.

In some embodiments, when the computer program is executed by the processor 701, the following step may be further implemented:

in a case that the first command includes the first signaling field and the second signaling field and that both P and Q are greater than 1, determining that a first TCI state corresponding to the preset position or number in the first signaling field is the separate TCI state of the DL, and determining that a second TCI state corresponding to the preset position or number in the second signaling field is the separate TCI state of the UL; or in a case that the first command includes only the first signaling field and that P is greater than 1, determining that a first TCI state corresponding to the preset position or number in the first signaling field is the joint TCI state of the UL and the DL.

In some embodiments, when the computer program is executed by the processor 701, the following steps may be further implemented:

before receiving the first command sent by the network device, receiving a third command sent by the network device, where the third command includes DCI signaling and/or a MAC CE command; and determining the separate TCI state or the joint TCI state of the UL and the DL according to the third command, where in a case that the first command includes the first signaling field and the second signaling field and that both P and Q are greater than 1, the third command is used to indicate one of the first TCI states as the separate TCI state of the DL and indicate one of the second TCI states as the separate TCI state of the UL; or in a case that the first command includes only the first signaling field and that P is greater than 1, the third command is used to indicate one of the first TCI states as the joint TCI state of the UL and the DL.

In some embodiments, in a multi TRP or multi channel group scenario, the first command is used to indicate at least one TCI state corresponding to each piece of TRP identification information or each channel group, where the channel group includes a plurality of channels and/or RSs.

In some embodiments, for any piece of TRP identification information or any channel group, the first command is used to indicate the joint TCI state of the UL and the DL of the TRP identification information or channel group; or the first command is used to indicate the separate TCI state corresponding to each of the UL and the DL of the TRP identification information or channel group.

In some embodiments, when the computer program is executed by the processor 701, the following step may be further implemented:

before receiving the first command sent by the network device, receiving a fourth command sent by the network device, where the fourth command is used to indicate that the first command indicates the joint TCI state or the separate TCI state for the TRP identification information or channel group, and the fourth command includes DC signaling and/or a MAC CE command.

In some embodiments, when the computer program is executed by the processor 701, the following steps may be further implemented:

determining each piece of TRP identification information or each channel group identification and/or corresponding indication content according to the first command, where the indication content includes at least one of the first signaling field, the second signaling field, and the first indication information; and determining, according to each piece of TRP identification information or each channel group identification and/or the corresponding indication content, at least one TCI state corresponding to each piece of TRP identification information or each channel group identification.

In some embodiments, when the computer program is executed by the processor 701, the following step may be further implemented:

if the first command includes each piece of TRP identification information or each channel group identification, and indication content corresponding to each identification, determining each piece of TRP identification information or each channel group identification and/or the corresponding indication content according to each piece of TRP identification information or each channel group identification in the first command;

if the first command includes at least one group of indication content corresponding to the TRP identification information or channel group, and does not include the TRP identification information or a channel group identification, determining each piece of TRP identification information or each channel group identification and/or the corresponding indication content according to an arrangement sequence or position of each group of indication content in the first command;

if there are a plurality of first commands, and each first command includes one piece of TRP identification information or one channel group identification and corresponding indication content, determining each piece of TRP identification information or each channel group identification and/or the corresponding indication content according to each identification included in the first command; or if there are a plurality of first commands, and each first command includes indication content corresponding to one piece of TRP identification information or one channel group, and does not include the TRP identification information or a channel group identification, determining each piece of TRP identification information or each channel group identification and/or the corresponding indication content according to at least one of time domain information, frequency domain information, and code domain information in each first command.

In some embodiments, the first command further includes second indication information corresponding to the TRP identification information or channel group identification and/or the indication content; and the determining, according to the first command, indication content corresponding to each piece of TRP identification information or each channel group further includes:

if the second indication information indicates that there is the corresponding TRP identification information or channel group identification and/or the corresponding indication content in the first command, determining that there is the TRP identification information or channel group identification and/or the corresponding indication content in the first command, or if the second indication information indicates that there is not the corresponding TRP identification information or channel group identification and/or the corresponding indication content in the first command, determining that there is not the TRP identification information or channel group identification and/or the corresponding indication content in the first command.

In some embodiments, when the computer program is executed by the processor 701, the following step may be further implemented:

if the first indication information indicates that the second signaling field does not exist, determining that the first TCI state in the first signaling field is the joint TCI state of the UL and the DL; or if the first indication information indicates that the second signaling field exists, determining that the first TCI state in the first signaling field is the separate TCI state corresponding to the DL, and determining that the second TCI state in the second signaling field is the separate TCI state corresponding to the UL.

The terminal device 700 can implement each process implemented by the terminal device in the foregoing embodiment. To avoid repetition, details are not described herein again.

In this embodiment of this application, the network device configures the TCI state pool and sends the first command to the terminal device, where the first command is used to indicate the at least one TCI state in the TCI state pool, and the at least one TCI state is used to indicate the common beam information of the plurality of channels and/or RSs, so that the terminal device can determine, according to the first command, the at least one TCI state corresponding to the UL and/or the DL. Therefore, the network device can implement a unified beam indication mechanism for the plurality of channels and/or RSs, unnecessary signaling overheads are reduced, and the beam indication mechanism is improved.

An embodiment of this application further provides a readable storage medium, where a program or instructions are stored in the readable storage medium. When the program or instructions are executed by a processor, the processes of the foregoing beam indication method embodiment executed by the network device can be implemented, with same technical effects achieved. To avoid repetition, details are not described herein again.

The processor is a processor in the network device described in the foregoing embodiments. The readable storage medium includes a computer-readable storage medium, for example, a computer ROM, an RAM, a magnetic disk, or an optical disc.

An embodiment of this application further provides a readable storage medium, where a program or instructions are stored in the readable storage medium. When the program or instructions are executed by a processor, the processes of the foregoing beam indication method embodiment executed by the terminal device can be implemented, with same technical effects achieved. To avoid repetition, details are not described herein again.

The processor is a processor in the terminal device described in the foregoing embodiments. The readable storage medium includes a computer-readable storage medium, for example, a computer ROM, an RAM, a magnetic disk, or an optical disc.

An embodiment of this application further provides a chip, where the chip includes a processor and a communications interface, the communications interface is coupled to the processor, and the processor is configured to run a program or instructions to implement the foregoing beam indication method embodiments, with the same technical effects achieved. To avoid repetition, details are not repeated herein.

It should be noted that the terms "comprise", "include", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that, in the scope of the method and device in the embodiments of this application, execution of the functions are not limited to the order shown or described, or the functions may be executed in a substantially simultaneous manner or in a reverse order. For example, the described method may be performed in an order different from that described, and steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, or may be implemented by using hardware. In some embodiments, the technical solutions of this application entirely or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A beam indication method, performed by a terminal device, comprising:
    receiving a first command sent by a network device, wherein the first command is a Media Access Control (MAC) Control Element (CE) command, wherein the first command comprises:
    a first signaling field with P first Transmission Configuration Indication (TCI) states, wherein P is a positive integer, and
    first indication information used to indicate whether a second signaling field with Q second TCI states exists, wherein Q is a positive integer,
    wherein the first command is used to indicate at least one TCI state in a TCI state pool, wherein the at least one TCI state comprises a joint TCI state or a separate TCI state, the TCI state pool is preconfigured by the network device, and the at least one TCI state is used to indicate common beam information of a plurality of channels or Reference Signals (RSs),
    wherein in a multi Transmission and Reception Point (TRP) or multi channel group scenario, the first command is used to indicate at least one TCI state corresponding to each piece of TRP identification information or each channel group, wherein the channel group comprises a plurality of channels or RSs,
    wherein for any piece of TRP identification information or any channel group, the first command is used to indicate the joint TCI state of the UL and the DL of the TRP identification information or channel group; or the first command is used to indicate the separate TCI state corresponding to each of the UL and the DL of the TRP identification information or channel group; and
    determining, according to the first command, the at least one TCI state corresponding to an Uplink (UL) or a Downlink (DL),
    wherein determining, according to the first command, the at least one TCI state corresponding to the UL or the DL comprises:
    determining each piece of TRP identification information or each channel group identification or corresponding indication content according to the first command, wherein the indication content comprises at least one of the first signaling field, the second signaling field, or the first indication information,
        wherein determining each piece of TRP identification information or each channel group identification or corresponding indication content according to the first command comprises: when the first command comprises at least one group of indication content corresponding to the TRP identification information or channel group, and does not comprise the TRP identification information or a channel group identification, determining each piece of TRP identification information or each channel group identification or the corresponding indication content according to an arrangement sequence or position of each group of indication content in the first command, and
    determining, according to each piece of TRP identification information or each channel group identification or the corresponding indication content, at least one TCI state corresponding to each piece of TRP identification information or each channel group.

2. The beam indication method according to claim 1, wherein the determining, according to the first command, the at least one TCI state corresponding to a UL or a DL further comprises:
    when the TCI state comprises at least one of a Quasi Co-Location (QCL) type-A RS, a QCL type-B RS, or a QCL type-C RS, determining that the at least one of the QCL type-A RS, the QCL type-B RS, or the QCL type-C RS is used only for the DL.

3. The beam indication method according to claim 1, wherein
the first command is used to indicate one joint TCI state for the UL and the DL; or
the first command is used to indicate, for each of the UL and the DL, the separate TCI state corresponding thereto.

4. The beam indication method according to claim 1, wherein the first command further comprises
the second signaling field with the Q second TCI states.

5. The beam indication method according to claim 4, wherein determining, according to the first command, the at least one TCI state corresponding to the UL or the DL further comprises:
when the first indication information indicates that the second signaling field does not exist, determining that the first TCI state in the first signaling field is the joint TCI state of the UL and the DL; or
when the first indication information indicates that the second signaling field exists, determining that the first TCI state in the first signaling field is the separate TCI state corresponding to the DL, and determining that the second TCI state in the second signaling field is the separate TCI state corresponding to the UL.

6. The beam indication method according to claim 1, wherein the TCI state pool is configured for a cell set, and the cell set comprises at least one cell.

7. The beam indication method according to claim 6, wherein the at least one TCI state is used for all cells in the cell set in which the at least one cell corresponding to the TCI state pool is located.

8. A terminal device, comprising a processor; a memory having a computer program or an instruction stored thereon, wherein the computer program or the instruction, when executed by the processor, causes the processor to perform a beam indication method, comprising:
receiving a first command sent by a network device, wherein the first command is a Media Access Control (MAC) Control Element (CE) command,
wherein the first command comprises:
a first signaling field with P first Transmission Configuration Indication (TCI) states, wherein P is a positive integer, and
first indication information used to indicate whether a second signaling field with Q second TCI states exists, wherein Q is a positive integer,
wherein the first command is used to indicate at least one TCI state in a TCI state pool, wherein the at least one TCI state comprises a joint TCI state or a separate TCI state, the TCI state pool is preconfigured by the network device, and the at least one TCI state is used to indicate common beam information of a plurality of channels or Reference Signals (RSs),
wherein in a multi Transmission and Reception Point (TRP) or multi channel group scenario, the first command is used to indicate at least one TCI state corresponding to each piece of TRP identification information or each channel group, wherein the channel group comprises a plurality of channels or RSs,
wherein for any piece of TRP identification information or any channel group, the first command is used to indicate the joint TCI state of the UL and the DL of the TRP identification information or channel group; or the first command is used to indicate the separate TCI state corresponding to each of the UL and the DL of the TRP identification information or channel group; and
determining, according to the first command, the at least one TCI state corresponding to an Uplink (UL) or a Downlink (DL),
wherein determining, according to the first command, the at least one TCI state corresponding to the UL or the DL comprises:
determining each piece of TRP identification information or each channel group identification or corresponding indication content according to the first command, wherein the indication content comprises at least one of the first signaling field, the second signaling field, or the first indication information,
wherein determining each piece of TRP identification information or each channel group identification or corresponding indication content according to the first command comprises: when the first command comprises at least one group of indication content corresponding to the TRP identification information or channel group, and does not comprise the TRP identification information or a channel group identification, determining each piece of TRP identification information or each channel group identification or the corresponding indication content according to an arrangement sequence or position of each group of indication content in the first command, and
determining, according to each piece of TRP identification information or each channel group identification or the corresponding indication content, at least one TCI state corresponding to each piece of TRP identification information or each channel group.

9. The terminal device according to claim 8, wherein the determining, according to the first command, the at least one TCI state corresponding to a UL or a DL further comprises:
when the TCI state comprises at least one of a Quasi Co-Location (QCL) type-A RS, a QCL type-B RS, or a QCL type-C RS, determining that the at least one of the QCL type-A RS, the QCL type-B RS, or the QCL type-C RS is used only for the DL.

10. The terminal device according to claim 8, wherein the TCI state pool is configured for a cell set, and the cell set comprises at least one cell.

11. The terminal device according to claim 10, wherein the at least one TCI state is used for all cells in the cell set in which the at least one cell corresponding to the TCI state pool is located.

12. The terminal device according to claim 8, wherein
the first command is used to indicate one joint TCI state for the UL and the DL; or
the first command is used to indicate, for each of the UL and the DL, the separate TCI state corresponding thereto.

13. The terminal device according to claim 8, wherein the first command further comprises the second signaling field with the Q second TCI states.

14. A non-transitory computer-readable storage medium, storing a computer program or an instruction that, when executed by a processor, causes the processor to perform a beam indication method, comprising:
receiving a first command sent by a network device, wherein the first command is a Media Access Control (MAC) Control Element (CE) command,
wherein the first command comprises:
a first signaling field with P first Transmission Configuration Indication (TCI) states, wherein P is a positive integer, and first indication information used to indicate whether a second signaling field with Q second TCI states exists, wherein Q is a positive integer, wherein the first command is used to indicate at least one TCI state in a TCI state pool, wherein the at least one TCI state comprises a joint TCI state or a separate TCI state, the TCI state pool is preconfigured by the network device, and the at least one TCI state is used to indicate common beam information of a plurality of channels or Reference Signals (RSs), wherein in a multi Transmission and Reception Point (TRP) or multi channel group scenario, the first command is used to indicate at least one TCI state corresponding to each piece of TRP identification information or each channel group, wherein the channel group comprises a plurality of channels or RSs, wherein for any piece of TRP identification information or any channel group, the first command is used to indicate the joint TCI state of the UL and the DL of the TRP identification information or channel group; or the first command is used to indicate the separate TCI state corresponding to each of the UL and the DL of the TRP identification information or channel group; and determining, according to the first command, the at least one TCI state corresponding to an Uplink (UL) or a Downlink (DL), wherein determining, according to the first command, the at least one TCI state corresponding to the UL or the DL comprises:

determining each piece of TRP identification information or each channel group identification or corresponding indication content according to the first command, wherein the indication content comprises at least one of the first signaling field, the second signaling field, or the first indication information, wherein the determining each piece of TRP identification information or each channel group identification or corresponding indication content according to the first command comprises: when the first command comprises at least one group of indication content corresponding to the TRP identification information or channel group, and does not comprise the TRP identification information or a channel group identification, determining each piece of TRP identification information or each channel group identification or the corresponding indication content according to an arrangement sequence or position of each group of indication content in the first command, and determining, according to each piece of TRP identification information or each channel group identification or the corresponding indication content, at least one TCI state corresponding to each piece of TRP identification information or each channel group.

* * * * *